United States Patent [19]

Driessen

[11] Patent Number: 4,790,242

[45] Date of Patent: Dec. 13, 1988

[54] DISCHARGE MANIFOLD FOR CHEESE CASTING MACHINE

[75] Inventor: Gerald J. Driessen, Little Chute, Wis.

[73] Assignee: Hart Design & Manufacturing Inc., Green Bay, Wis.

[21] Appl. No.: 133,373

[22] Filed: Dec. 15, 1987

[51] Int. Cl.⁴ .......................... A01J 25/00; A23C 9/00
[52] U.S. Cl. .......................................... 99/455; 94/464
[58] Field of Search ................. 99/453, 452, 455, 460, 99/464, 466; 366/182; 222/531, 537, 526, 544, 545, 630, 594, 597, 146.6; 426/517, 518, 512, 414; 425/224

[56] References Cited

U.S. PATENT DOCUMENTS

| | | | |
|---|---|---|---|
| 3,570,389 | 3/1971 | Pontecorvo | 99/455 |
| 3,707,769 | 1/1973 | Syrjanen et al. | 99/460 |
| 3,887,719 | 6/1975 | Miller | 99/464 |
| 4,433,618 | 2/1984 | Izutsu et al. | 99/455 |
| 4,665,811 | 5/1987 | Meyer | 99/455 |

Primary Examiner—Timothy F. Simone
Attorney, Agent, or Firm—Warren F. B. Lindsley

[57] ABSTRACT

An elongated discharge manifold for dispensing a sheet of hot processed cheese upon a cooling belt, the manifold is juxtapositioned across the width of the belt and comprises upper and lower chambers wherein a hot cheese product is introduced under pressure into the upper chamber, flows from the upper chamber into the lower chamber through individually adjustable valves and leaves the lower chamber by passing under an adjustable thickness control bar. Adjustment blocks are provided at each end of the manifold to control the width of the dispensed sheet of cheese.

8 Claims, 3 Drawing Sheets

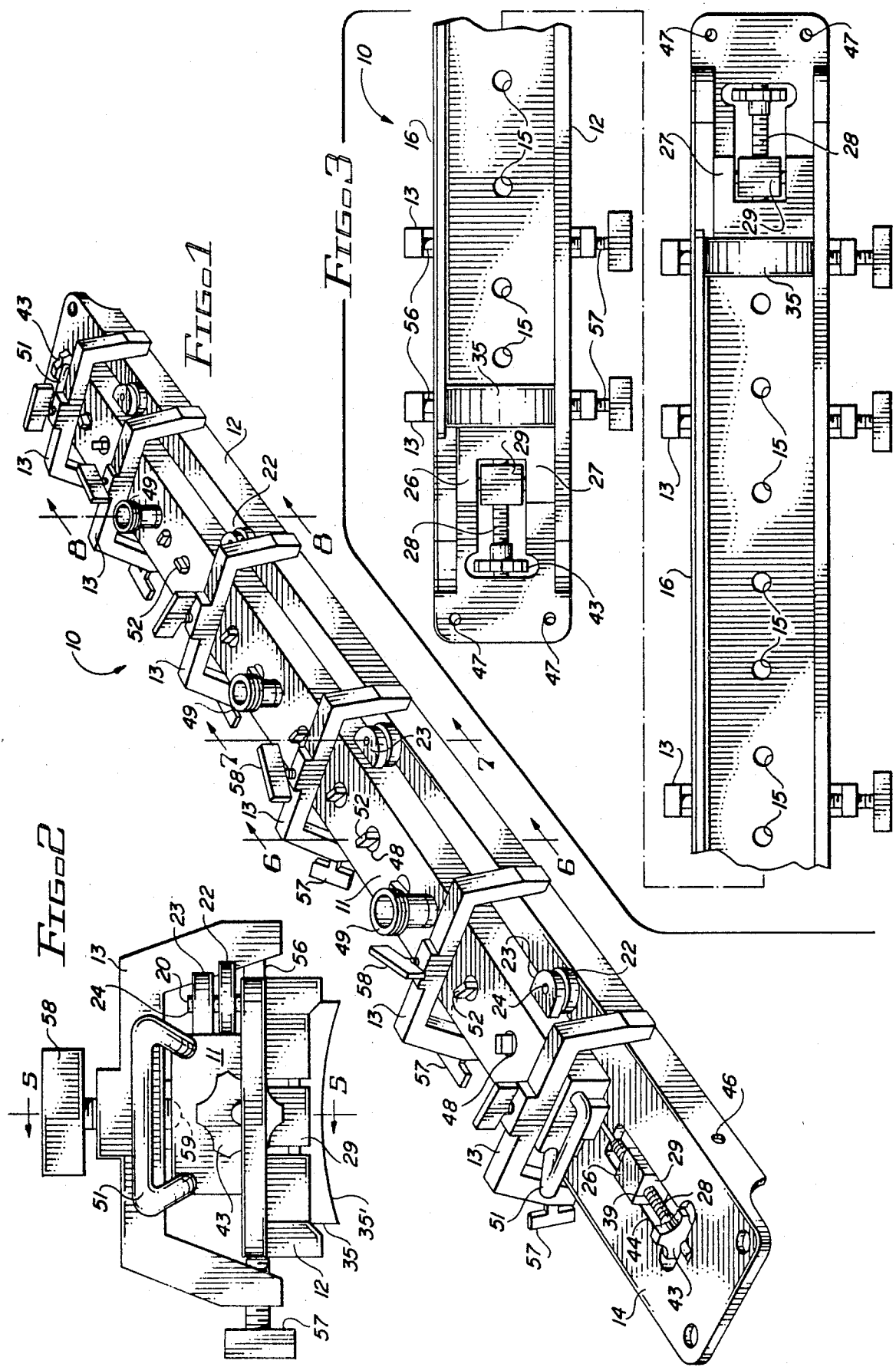

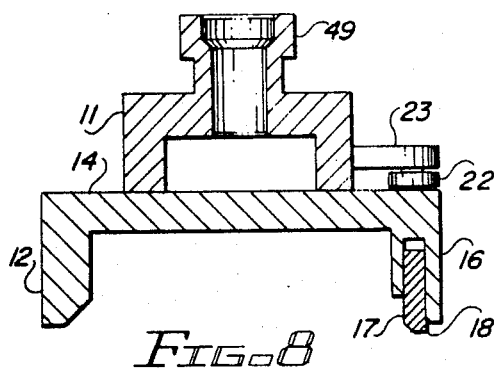
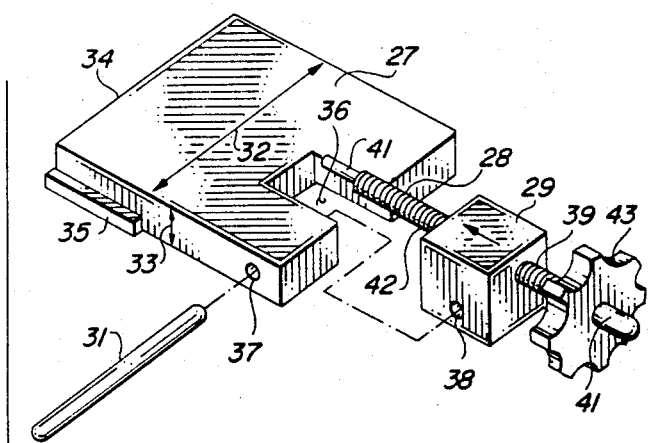
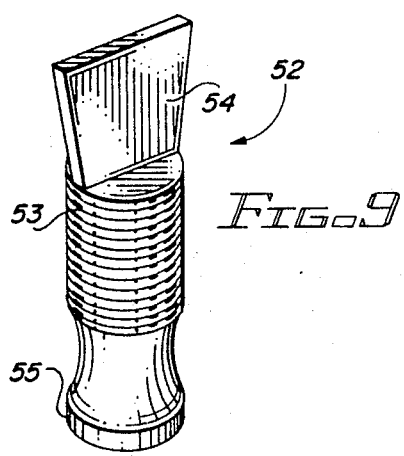
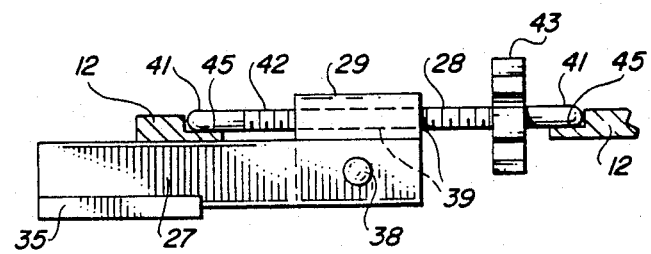
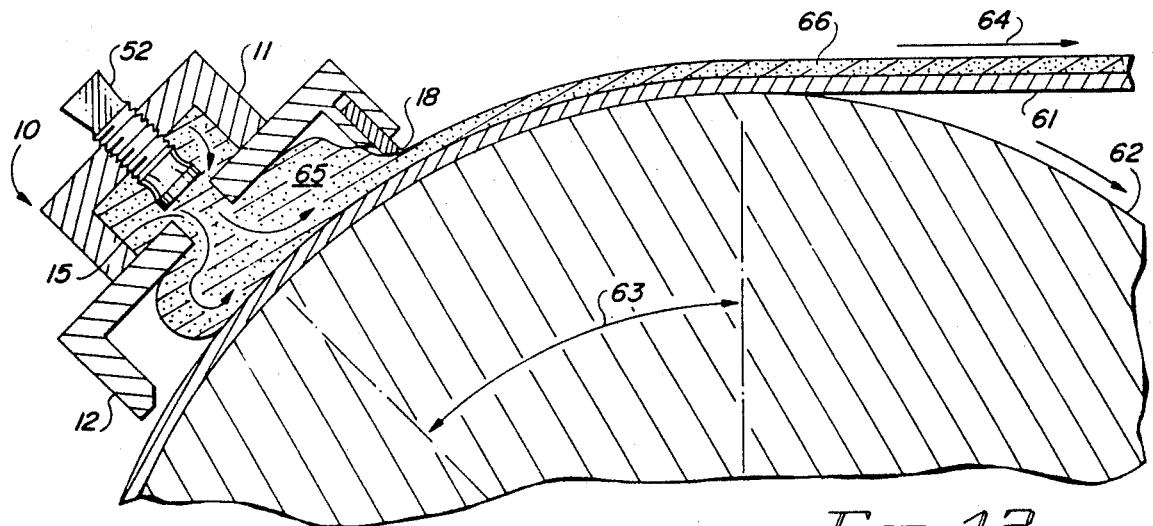
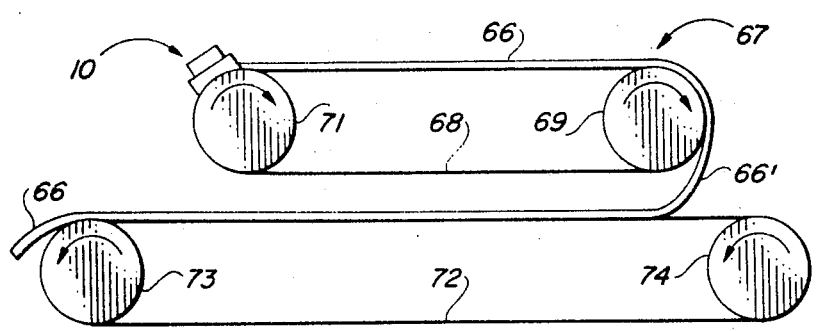

DISCHARGE MANIFOLD FOR CHEESE CASTING MACHINE

FIELD OF THE INVENTION

The present invention relates to the forming of hot processed cheese products into thin sheets as a first step in the packaging of the cheese for commercial distribution. More specifically, this invention comprises a manifold for the discharge of the hot product as a thin layer of melted cheese upon the surface of a cooling belt.

BACKGROUND OF THE INVENTION

Processed cheese products are difficult to cut or slice because the cheese tends to cling to the cutting surfaces. For this reason, it is preferable to form the hot melted product into thin sheets by an extrusion or casting process. When the thin sheets have been cooled, they are slit into narrow strips or ribbons. The strips are then stacked and cut to length for packaging as a "sliced" product.

The cheese casting machine in which the discharge manifold of the present invention is employed comprises two double-decked cooling belts with drive and idler drums spaced on 25 foot centers. Pans installed at the undersides of the belts are used to flood the insides of the belts with a cooling medium such as a refrigerated glycol solution.

The discharge manifold of the invention is mounted on the infeed end of the machine in a position of approximately 45 degrees around the radius of the upper drum at the idler end. At this point, the stainless steel belt is in its most stable position, and gives the best opportunity for thickness or weight control of the product as it is formed and discharged from the manifold.

The hot melted cheese is discharged upon the cooled surface of the upper belt in the form of a thin sheet evenly distributed across the width of the stainless steel belt. The underside of the sheet of cheese is cooled by the belt as the belt moves toward the driven drum at the far end of the upper belt. The partially cooled sheet then moves to the upper surface of the lower belt, the sheet now resting on its previously uncooled side. The second side of the sheet is cooled as it moves toward the driven drum at the far end of the lower belt.

In a subsequent operation, slitters are provided to cut the sheet into narrow ribbons. The ribbons are removed from the driven end of the lower belt and transferred through turning rollers to form a stack of ribbons traveling at right angles to the cooling belts. A transfer conveyor is used to carry the ribbons while they are being stacked, and to transfer them to a cut-off machine which delivers the individual stacks of product.

A number of functional characteristics are essential for the discharge manifold. It must have a capability for receiving the hot melted cheese product under pressure and distributing it uniformly along the full length of the manifold. This must be accomplished rapidly and on a continuous basis to accommodate the high rate at which the product is discharged upon the cooling belt. The manifold must also provide for a uniform and continuous discharge of the cheese to the cooling surface with appropriate adjustment means provided as needed to accommodate the difference in product density and viscosity. Means must be provided for uniformly controlling sheet width and thickness. Finally, the manifold must be easily assembled and disassembled for cleaning purposes.

SUMMARY OF THE INVENTION

In accordance with the invention claimed, a discharge manifold is provided for a cheese casting machine in which a thin sheet of melted cheese product is distributed over the surface of a cooling belt.

It is, therefore, an object of the present invention to provide a discharge manifold for a cheese casting machine.

Another object of this invention is to provide in such a manifold a capability for receiving hot processed cheese products under pressure and for rapidly distributing the hot product along the length of the manifold.

A further object of this invention is to provide in such a manifold a capability for discharging the hot product uniformly across the width of the cooling belt with adjustments provided to assure such uniformity for products having different densities and viscosities.

A still further object of this invention is to provide in such a manifold a capability for uniformly distributing and discharging the hot product at high rates of discharge and correspondingly high cooling belt velocities.

A still further object of this invention is to incorporate in such a manifold a means for adjusting and controlling the width of the sheet of discharged product.

A still further object of this invention is to incorporate in such a manifold a means for accurately adjusting and controlling the thickness of the sheet of discharged product.

Further objects and advantages of this invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a perspective view of the hot processed cheese discharge manifold of the invention;

FIG. 2 is an end view of the discharge manifold of FIG. 1;

FIG. 3 is a view of the underside of the discharge manifold of FIG. 1;

FIG. 8 is a cross-sectional view taken along line 8—8 of FIG. 1;

FIG. 9 is a perspective view of a valve element employed in the manifold to control the uniform distribution and discharge of the cheese product as it passes through the manifold;

FIG. 10 is a perspective view showing the elements of the mechanism that controls the width of the discharged sheet of cheese product;

FIG. 11 is a side view showing the width control elements of FIG. 10 assembled together;

FIG. 12 is a cross-sectional side view of the discharge manifold mounted and in use over the cooling belt and its associated idler drum; and FIG. 13 is a functional diagram illustrating the general operation of the cheese casting machine in which the discharge manifold of the invention is employed.

DESCRIPTION OF THE PREFERRED EMBODIMENT

Referring more particularly to the drawings by characters of reference, FIGS. 1–13 show a discharge manifold 10 comprising an upper chamber 11, a lower chamber 12, and a number of spacedly mounted manifold clamps 13 for securing the upper chamber in position upon the lower chamber.

Lower chamber 12 comprises an elongated rectangular configuration closed on its top and on all four vertical sides but open on the bottom. Its length is approximately equal to the width of the cooling belt over which it is to be mounted so that when it is mounted over the belt with its longitudinal dimension oriented perpendicularly relative to the motion of the belt its open underside spans the width of the belt.

Figure 4:
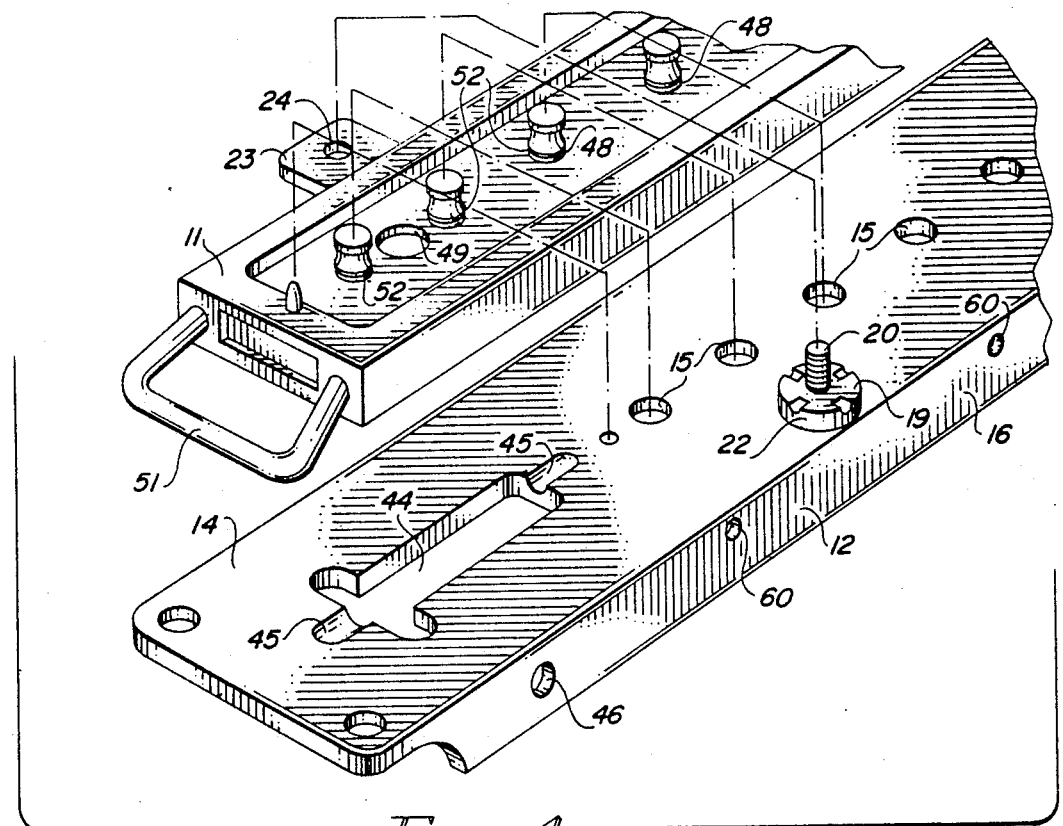
FIG. 4 is a perspective view of the discharge manifold of FIG. 1 with the upper chamber removed to reveal details of internal construction.

The upper outside surface 14 of lower chamber 12 is flat and smooth so that it may serve as a baseplate for upper chamber 11. As shown in FIGS. 3 and 4, there are a number of spacedly positioned ports, passageways or holes 15 provided in the top of chamber 12. Holes 15 are uniformly spaced apart along the longitudinal centerline of surface 14 and serve as passageways through which a hot, melted cheese product may move as it travels from upper chamber 11 into lower chamber 12.

As shown in FIGS. 3, 6, 7, 8 and 12, a long vertical wall 16 at the discharge side of chamber 12 is slotted vertically from the bottom substantially along its entire length. Operating within this slot 17 is a gate or cheese thickness control blade or bar 18. Bar 18 is a long thin strip of metal that is movable vertically within slot 17 under the control of four thickness control adjustment nuts 22.

Figure 7:
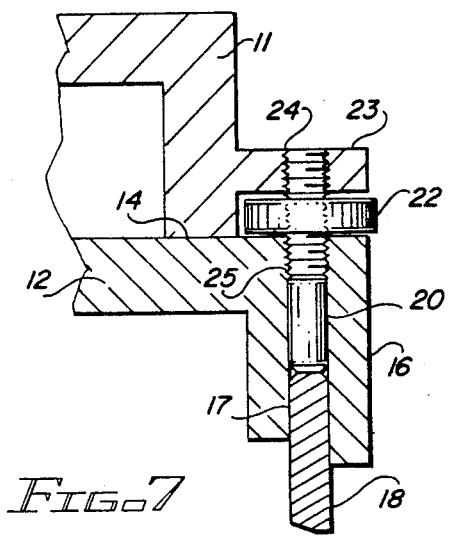
FIG. 7 is a partial cross-sectional view taken along line 7—7 of FIG. 1.

As shown in FIG. 7, the adjustment studs 20 extend vertically upward from the top edge of bar 18 engaging threaded nuts 22 above. A mounting lug 23 is provided for each of the studs and comprises a flat tab extending horizontally from the vertical side of upper chamber 11 along the side of chamber 11 that lies above bar 18. As shown in FIG. 1, the plan view of each of lugs 23 shows a rounded outer end and a mounting hole 24 that is centered at the radius of curvature of the rounded outer end. Nut 22 when assembled for control of bar 18 allows stud 20 to project through clearance hole 24, and its annular projection rotatably captured between top surface 14 of chamber 12 and the underside of lug 23. The threaded lower end of each of studs 20 passes through a clearance hole 25 of chamber 12 where it is attached to top of bar 18. With stud 20 threaded into nut 22, bar 18 may be moved up or down by rotating nut 22 in the appropriate direction.

Incorporated in each end of lower chamber 12 is a width control assembly 26. As shown most clearly in FIGS. 1, 10 and 11, width control assembly 26 comprises a width adjustment block 27, a width adjustment screw 28, a retaining block 29 and a retaining pin 31.

Width adjustment block 27 has the overall form of a thick rectangular, approximately square plate, its width dimension 32 approximating the inside width dimension of lower chamber 12 and its thickness dimension 33 equal to the inside depth dimension of chamber 12, so that when block 27 is slidably installed inside chamber 12 it serves as a movable gate that may be positioned to control the overall interior length of chamber 12 and thereby to control the width of the discharged sheet of cheese. At the forward end 34 of block 27, a filler rib 35 is provided extending laterally from side of block 27. Rib 35 fits into and travels within mating groove formed by the inside surface of chamber 12 and bar 18 as block 27 is moved back and forth. A centered rectangular or square opening 36 at the rearward end of block 27 forms a clevis configuration for the coupling of block 27 to retaining block 29, the clevis configuration being completed by a transverse hole or bore 37 that passes through both legs of the clevis configuration.

Retaining block 29 has an overall configuration approximating a cube that fits snugly between the legs of the clevis formation of block 27 inside opening 36. A bore 38 of the same diameter as bore 37 of block 27 passes transversely through its lower half and a threaded hole 39 passes longitudinally through its upper half. When block 29 is installed in opening 36 of block 27, and bores 37 and 38 are aligned, blocks 27 and 29 may be secured together by inserting pin 31 into holes 37 and 38. In this coupled condition, the lower surface of block 29 is flush with the lower surface of block 27, and the upper half (approximately) of block 29 extends above the top surface of block 27, as shown in FIG. 11.

Screw 28 has unthreaded portions 41 at each end of the threaded center portion 42. The outer ends of portions 41 are rounded. At the rearward end of screw 28, just inboard from the unthreaded portion 41, a width control wheel 43 is provided.

At each end of lower chamber 12 in upper surface 14, a specially shaped and contoured opening 44 is provided as a cradle for width control assembly 26. As shown in FIGS. 1 and 11, the opening 44 provides clearance for retaining block 29 and control wheel 43. At the forward and rearward ends of opening 44, semi-cylindrical depressions 45 with rounded ends are provided in surface 14, the depressions 45 serving as cradles for the unthreaded ends 41 of screw 28.

The installation of width control assembly 26 proceeds as follows: Screw 28 is first threaded all the way into hole 39 of block 29. Screw 28 and block 29 are then dropped into position in opening 44. Block 27 is then installed from below, just ahead of retainer block 29 with block 29 occupying opening 36 of block 27, and with bores 37 and 38 aligned. Pin 31 is now installed in bores 37 and 38 by passing pin 31 through a clearance hole 46 in the wall of chamber 12 that will, under the foregoing circumstances, be aligned with bores 37 and 38. Finally, while holding width adjustment block 27 in position, control wheel 43 is rotated counterclockwise to move retaining block 29 and width adjustment block 27 forward. As block 27 moves forward, the filler rib 35 engages the mating groove on the inside wall of chamber 12. Assembly 26 is now securely but slidably supported by means of screw 28, block 29 and pin 31. The position of width adjustment block 27 may be controlled as desired by turning control wheel 43.

It should be noted that blocks 27, one at each end of the manifold, seal the ends of lower chamber 12. To accomplish this sealing function, the underside surface 35' of rib 35 of each of blocks 27 is provided with an arcuate configuration, as shown in FIG. 2, which matches the arcuate configuration of the bell mounted upon the drum of the associated cheese casting machine. This matching configuration seals the ends of chamber 12 at each of the various positions of blocks 27, hereby determining the width of the cheese ribbon dispensed by the manifold.

At both ends of lower chamber 12 two mounting holes 47 are provided for mounting manifold 10 to the frame of a cheese casting machine.

Upper chamber 11 is similar to lower chamber 12 in its proportions and general configuration, but it is somewhat shorter and approximately half as wide. Chamber 11 is long and rectangular and is closed on top and on all vertical sides, but open on the bottom. The lower edges of its vertical sides are machined to a flat, smooth surface so that when they rest upon surface 14 of lower chamber 12, a substantially closed chamber and a sealed interface results between the abutting surfaces.

A number of threaded holes 48 are provided along the longitudinal centerline of the top wall of chamber 11, there being one hole 48 associated with each of holes 15 in lower chamber 12. Holes 48 in upper chamber 11 are positioned such that when upper chamber 11 is clamped in place over lower chamber 12, each hole 48 is in alignment with its associated hole 15.

Also provided along the longitudinal centerline of the top wall of chamber 11 are three or more intake ports 49 which facilitate the connection of sanitary piping for the introduction of the melted cheese product into the manifold. The three intake ports 49 shown are uniformly spaced along the centerline to provide good distribution of the cheese product as it enters the cavity formed within chamber 11.

A handle 51 is provided at each end of chamber 11 to facilitate the handling of the chamber during assembly, disassembly and cleaning operations.

A manifold adjustment valve 52 is provided for each of the threaded holes 48. As shown in FIG. 9, adjustment valve 52 has a threaded center section 53, a paddle-shaped grip 54 at one end, and a disc-shaped throttling member 55 at the other end. Throttling member 55 is circular and flat on the end, and the plane of the flat circular surface is perpendicular to the longitudinal axis of valve 52. Threaded portion 53 of valve 52 mates with threaded holes 48 of chamber 11 so that when valves 52 are installed one in each of holes 48, they may be raised or lowered by turning grips 54 employed for this purpose.

As shown in FIG. 1, upper chamber 11 is mounted and secured in position upon lower chamber 12 by means of manifold clamps 13. Each of the clamps comprises a U-shaped frame with the legs of the U spread apart to fit over the edges or sides of lower chamber 12. One of the two legs has a pin 56 with a rounded end directed toward the vertical surface of chamber 12; the other leg has a thumbscrew 57 threadably installed with its rounded end directed toward the vertical surface of chamber 12 at the opposite side. The rounded end of pin 56 engages a dimple 60 on its side of chamber 12, and the rounded end of thumbscrew 57 engages a dimple 60 on its side of chamber 12 so that when thumbscrew 57 is tightened, the clamp 13 is secured in position with a strong gripping action.

Threadably installed in the top of clamp 13 at its center is a second thumbscrew 58 directed downwardly toward the top surface of chamber 11, and is provided with a rounded end at the tip of its threaded shaft.

As shown in FIGS. 1 and 2, when upper chamber 11 is positioned over lower chamber 12, clamps 13 pass over upper chamber 11 and span the width of lower chamber 12 so that once pin 56 and thumbscrew 57 have been locked into engagement with the associated dimples in the surfaces of chamber 12, thumbscrew 58 may be advanced until its rounded end engages an aligned dimple 59 in the top surface of chamber 11 (see FIG. 2). As thumbscrew 58 is tightened against the top of chamber 11, chamber 11 is tightly clamped against surface 14 of chamber 12 to seal the interface between the two chambers.

Figure 5:
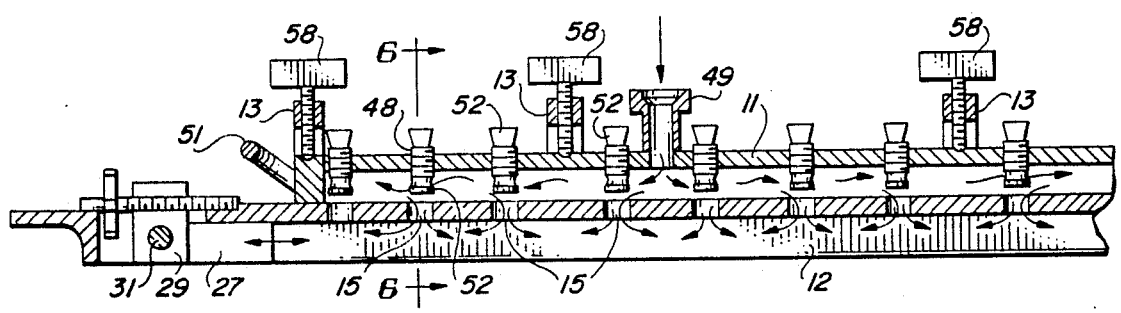
FIG. 5 is a cross-sectional view taken along line 5—5 of FIG. 2.
Figure 6:
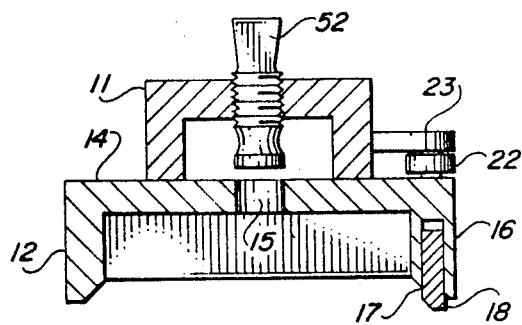
FIG. 6 is a cross-sectional view taken along line 6—6 of FIG. 5.

FIGS. 4, 5, 6 and 8 further clarify the orientation of the various parts of manifold 10 as described thus far. FIGS. 4, 5 and 6 illustrate the orientation of valves 52 relative to holes 15. It is apparent from FIGS. 5 and 6, that as one of valves 52 is advanced, its throttling member 55 approaches aligned hole 15 that enters lower chamber 12. The relative dimensions of member 55 and hole 15 are such that when member 55 seats on the periphery or enters hole 15, the flow through that hole is virtually cut off. A wide range of control over the flow through individual holes 15 is thus provided. As shown in FIGS. 5 and 8, port 49 communicates with upper chamber 11, but does not provide direct entry into chamber 12. The only passage from chamber 11 to chamber 12 is via holes 15.

Chambers 11 and 12, clamps 13 and other parts of manifold 10 are preferably made of stainless steel with the exception of valve 52, adjustment block 27 and retaining block 29 which are more appropriately made of nylon or plastic.

The cross-sectional view of FIG. 12 shows manifold 10 in operation. Manifold 10 is shown mounted over a stainless steel cooling belt 61. As pointed out earlier, belt 61 is most stable over the drums, and the better stability of the belt in such locations permits more uniform thickness control of the web of cheese being dispensed by the manifold. For this reason, manifold 10 is mounted over the idler drum 62 as shown in FIG. 12, at an angle 63 as measured from the vertical of approximately 45°. It should be recognized, however, that the manifold may be placed at any point along the length of the belt and still fall within the scope of this invention.

The flow of the hot, melted cheese product is illustrated in FIGS. 5 and 12. The cheese product is introduced into upper chamber 11 under pressure via ports 49. Chamber 11 is substantially filled with the cheese product. From chamber 11 the product passes through holes 15 into chamber 12. To achieve a uniform distribution along the length of manifold 10, and therefore across the width of cooling belt 61, valves 52 are adjusted while observing the resulting uniformity of the product delivered by the manifold. Because some of holes 15 are farther removed from intake ports 49 than others, a larger pressure drop results for such ports and valve 52 must be opened to a greater degree than in the case of the holes 15 that are nearer the intake ports.

As shown in FIG. 12, the clockwise rotation of the idler drum 62 moves belt 61 to the right as shown by arrow 64. The cheese product 65 that enters chamber 12 is thus carried to the right by belt 61, and exits chamber 12 by passing under thickness control bar 18. Bar 18 meters and levels product 65 as it leaves the manifold. The height of bar 18 or its elevation above the surface of belt 61 as controlled by the thickness control adjustment nuts 22 regulates the thickness and weight of the product dispensed as a continuous sheet 66 upon the cooling belt. As described earlier, the width of the dispensed sheet 66 is controlled by means of the width control assembly 26.

The application of manifold 10 and its operation as an element of a total cheese casting machine 67 is illustrated in FIG. 13. FIG. 13 shows an upper cooling belt 68 operating upon a driven drum 69 and an idler drum 71 with a second cooling belt 72 operating directly below belt 68 upon a driven drum 73 and an idler drum 74. The cheese product 66 delivered by manifold 10 has its underside cooled as it is transported by belt 68 from idler drum 71 to driven drum 69. As the partially cooled sheet 66' is transferred from belt 68 to belt 72 at drum 69, it is turned over so that its previously uncooled side now rests face down upon cooling belt 72. The second side of sheet 66 is thus cooled as the product is moved by belt 72 toward drum 73.

Manifold 10 is readily assembled without the use of tools with the exception of a simple wrench for turning the thickness control nuts 22 and width control wheels 43. The shaft of this wrench is employed to remove pin 31 from holes 37 and 38 of width control assembly 26. Separation of chambers 11 and 12 without tools is facilitated by the use of thumbscrews 57 and 58 of clamp 13.

An effective cheese dispensing manifold is thus provided in accordance with the stated objects of the invention, and although but a single embodiment of the invention has been illustrated and described, it will be apparent to those skilled in the art that various changes and modifications may be made therein without departing from the spirit of the invention or from the scope of the appended claims.

What is claimed is:

1. A manifold for dispensing a sheet of hot processed cheese product upon a cooling belt, said manifold comprising:
    an elongated hollow upper chamber having a top and a bottom opened along at least a part of its length for seating on the top surface of an elongated hollow lower chamber,
    a plurality of input ports spacedly positioned along the length of the top of said upper chamber to extend into its interior,
    said elongated hollow lower chamber having a top surface for receiving in a sealing arrangement thereon the periphery of the opening of said bottom of said upper chamber,
    means for securing said upper chamber on said lower chamber in said sealing arrangement,
    a plurality of spacedly positioned ports in communication with the opening of the bottom of said upper chamber and extending through the top surface of said lower chamber and into its interior,
    a plurality of adjustable valves, one for each of said ports mounted on and extending through the top of and into the interior of said upper chamber for selectively controlling product flow from said upper chamber through said ports and into said lower chamber, and
    a controllable gate mounted along one side of said lower chamber,
    said gate causing a ribbon-like flow of the product out of said lower chamber and being adjustable for controlling its thickness,
    whereby the product is introduced into said upper chamber of the manifold under pressure, flows from said upper chamber through said ports and into said lower chamber in a controlled manner, and out of said lower chamber through said controllable gate in ribbon form of a selected thickness.

2. The manifold set forth in claim 1 wherein:
    said gate comprises a blade forming a part of one side of said lower chamber which is movable relative to said lower chamber for controlling the flow of the product out of said lower chamber.

3. The manifold set forth in claim 2 wherein:
    said blade is adjustably movable separately at a number of points along its length.

4. The manifold set forth in claim 1 wherein:
    said upper chamber and said lower chamber comprise rectangular configurations.

5. The manifold set forth in claim 1 wherein:
    said valves are threadedly mounted in holes extending through the top of said upper chamber.

6. The manifold set forth in claim 1 wherein:
    said means for securing said upper chamber on said lower chamber comprises a plurality of clamps spacedly positioned along the length of the manifold.

7. The manifold set forth claim 1 in further combination with:
    adjustment means mounted within said lower chamber at one end thereof for movement axially thereof for changing the length of said lower chamber and the width of the ribbon-like flow of the product dispensed through said 8. The manifold set forth in claim 1 in further combination with:
    adjustment means mounted within said lower chamber at each end thereof for moving axially thereof for changing the length of said lower chamber and the width of the ribbon-like flow of the product dispensed through said gate.

* * * * *

UNITED STATES PATENT OFFICE
CERTIFICATE OF CORRECTION

Patent No. 4,790,242          Dated  December 13, 1988

Inventor(s) Gerald J. Driessen

It is certified that error appears in the above-identified patent and that said Letters Patent is hereby corrected as shown below:

Claim 7, line 1, after "forth" insert ---in---.

Claim 7, line 7, after "said" insert ---gate.---.

Signed and Sealed this

Second Day of May, 1989

*Attest:*

DONALD J. QUIGG

*Attesting Officer*          *Commissioner of Patents and Trademarks*